US009398604B2

(12) United States Patent
Zhang et al.

(10) Patent No.: US 9,398,604 B2
(45) Date of Patent: Jul. 19, 2016

(54) SYSTEM AND METHOD FOR MANAGING MULTIRADIO COMMUNICATIONS IN A SINGLE DEVICE

(75) Inventors: Yujian Zhang, Beijing (CN); Hujun Yin, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 261 days.

(21) Appl. No.: 13/976,995

(22) PCT Filed: Dec. 28, 2011

(86) PCT No.: PCT/US2011/067550
§ 371 (c)(1),
(2), (4) Date: Jun. 27, 2013

(87) PCT Pub. No.: WO2013/006199
PCT Pub. Date: Jan. 10, 2013

(65) Prior Publication Data
US 2013/0273857 A1    Oct. 17, 2013

Related U.S. Application Data

(60) Provisional application No. 61/504,054, filed on Jul. 1, 2011.

(51) Int. Cl.
*H04W 88/06* (2009.01)
*H04W 72/12* (2009.01)
(Continued)

(52) U.S. Cl.
CPC ......... *H04W 72/1215* (2013.01); *H04B 7/0697* (2013.01); *H04B 15/00* (2013.01); *H04L 1/0038* (2013.01); *H04L 1/0041* (2013.01); *H04L 1/0045* (2013.01); *H04L 1/06* (2013.01);

*H04L 5/0037* (2013.01); *H04L 5/14* (2013.01); *H04L 27/34* (2013.01); *H04W 4/005* (2013.01);
(Continued)

(58) Field of Classification Search
CPC ........................... H04W 72/04–72/042; H04W 52/0209–52/0212; H04W 24/00–24/02; H04B 15/00
See application file for complete search history.

(56) References Cited

U.S. PATENT DOCUMENTS

2006/0109827 A1* 5/2006 Zhang ..................... H04L 29/06
370/338
2006/0245406 A1* 11/2006 Shim ................... H04L 63/0272
370/338
(Continued)

OTHER PUBLICATIONS

International Search Report and Written Opinion, Mailed Date: Aug. 14, 2012, Application No. PCT/US2011/067550, Filed Date: Dec. 28, 2011, pp. 9.
(Continued)

*Primary Examiner* — Gennadiy Tsvey

(57) ABSTRACT

An apparatus may include a processor circuit and a communication scheduling module operable on the processor circuit to receive a first set of terminal information of a first terminal transceiver, and a second set of terminal information of a second terminal transceiver, determine whether the first and second terminal transceivers are co-located in a radio terminal based on the first and second sets of terminal information, and schedule first and second radio-frequency (RF) communications with the first and second terminal transceivers, respectively, of the radio terminal to reduce interference between the first and second communications when the first and second terminal transceivers are co-located within the radio terminal. Other embodiments are disclosed and claimed.

14 Claims, 12 Drawing Sheets

(51) Int. Cl.

| | |
|---|---|
| *H04W 72/08* | (2009.01) |
| *H04B 7/06* | (2006.01) |
| *H04L 1/06* | (2006.01) |
| *H04W 72/04* | (2009.01) |
| *H04B 15/00* | (2006.01) |
| *H04W 8/02* | (2009.01) |
| *H04W 24/00* | (2009.01) |
| *H04W 52/24* | (2009.01) |
| *H04W 52/02* | (2009.01) |
| *H04L 5/00* | (2006.01) |
| *H04L 27/34* | (2006.01) |
| *H04L 5/14* | (2006.01) |
| *H04W 4/00* | (2009.01) |
| *H04W 72/02* | (2009.01) |
| *H04W 76/02* | (2009.01) |
| *H04W 52/14* | (2009.01) |
| *H04L 27/36* | (2006.01) |
| *H04L 1/00* | (2006.01) |
| *H04W 52/32* | (2009.01) |
| *H04W 24/08* | (2009.01) |
| *H04W 84/04* | (2009.01) |

(52) U.S. Cl.
CPC ............... *H04W8/02* (2013.01); *H04W 24/00* (2013.01); *H04W 52/0209* (2013.01); *H04W 52/0212* (2013.01); *H04W 52/0251* (2013.01); *H04W 52/0258* (2013.01); *H04W 52/143* (2013.01); *H04W 52/242* (2013.01); *H04W 52/244* (2013.01); *H04W 72/02* (2013.01); *H04W 72/04* (2013.01); *H04W 72/042* (2013.01); *H04W 72/082* (2013.01); *H04W 72/1278* (2013.01); *H04W 76/028* (2013.01); *H04W 88/06* (2013.01); *H04L 1/0025* (2013.01); *H04L 27/362* (2013.01); *H04W 24/08* (2013.01); *H04W 52/325* (2013.01); *H04W 84/042* (2013.01); *Y02B 60/50* (2013.01)

(56) References Cited

U.S. PATENT DOCUMENTS

| | | | |
|---|---|---|---|
| 2007/0197212 A1* | 8/2007 | Marsico | H04W 4/16 455/433 |
| 2008/0240021 A1 | 10/2008 | Guo et al. | |
| 2009/0061849 A1* | 3/2009 | Yang et al. | 455/426.1 |
| 2009/0180451 A1 | 7/2009 | Alpert et al. | |
| 2010/0056136 A1 | 3/2010 | Zhu | |
| 2010/0165959 A1* | 7/2010 | Park et al. | 370/338 |
| 2010/0173667 A1* | 7/2010 | Hui et al. | 455/552.1 |
| 2010/0330977 A1 | 12/2010 | Kadous et al. | |
| 2011/0097998 A1 | 4/2011 | Ko et al. | |
| 2011/0134891 A1* | 6/2011 | Yang et al. | 370/336 |
| 2011/0312288 A1* | 12/2011 | Fu et al. | 455/88 |

OTHER PUBLICATIONS

Extended European Search Report received for European Patent Application No. 11868886.0, mailed Feb. 5, 2015, 7 pages.

\* cited by examiner

SYSTEM AND METHOD FOR MANAGING MULTIRADIO COMMUNICATIONS IN A SINGLE DEVICE

This application claims priority to U.S. provisional patent application No. 61/504,054 filed Jul. 1, 2011 and incorporated by reference herein in its entirety.

BACKGROUND

In the present, smart phones, tablet computing devices, and other devices typically include multiple radio transceivers that can be used for communications with different networks, such as wireless wide area networks (WWAN), wireless local area networks (WLAN), satellite networks, and other networks. Because such devices may often operate in an environment where more than one type of network can be accessed at the same time, such devices can acquire and communicate with multiple networks at the same time. For example, a mobile station, or user equipment (UE) may be equipped with a transceiver for 3GPP communications (LTE), a WLAN transceiver, a global navigation satellite system (GNSS) transceiver, and Bluetooth transceiver, among others. One challenge is the need to avoid or minimize interference between such radio communications having different transceivers co-located in the same UE and thus subject to significant interference from one another when operating simultaneously.

Several methods to address this type of interference are possible. Frequency division multiplexing of two different radios is possible in which the communication frequencies carrying the different respective radio signals are separated. Time division multiplexing (TDM) may be employed to ensure that when one transceiver of a UE is transmitting, the other is not receiving. Other approaches include using radio-frequency (RF) filtering to reduce out-of-band emission (Tx filter) or to avoid blocking effects (Rx filter). Power based solutions can reduce transmission power of a transceiver and thereby reduce the level of interference. The above approaches may also be employed in combination to reduce interference.

However, the above approaches attempt to address interference problems by coordination of co-located devices within a mobile terminal, which may add to complexity and cost in the mobile terminal. It is with respect to these and other considerations that the present improvements have been needed.

DETAILED DESCRIPTION

Various embodiments are related to reducing interference in a multi-radio device. Consistent with some embodiments, the multi-radio device may be a portable device, such as a smart phone, personal digital assistant, mobile phone, or tablet computing device, among others. In particular, the present embodiments facilitate reducing interference in multi-radio devices in which services may be provided via more than one radio transceiver of the multiple-radio device.

In various embodiments, the multi-radio device may connect to a first network via a first transceiver and may connect to a second network via a second transceiver. Consistent with various embodiments, the radio resources of the first and second network may be colocated in the same installation. For example, a 3GPP LTE evolved node B (eNB) base station may be colocated with a WLAN access point (AP) within a common installation on wireless user equipment (UE). A single entity may manage or coordinate operation between the eNB and AP. In various embodiments, the eNB and AP may coordinate communications with a multi-radio device. For example, the multiradio device may contain a WWAN (such as 3GPP LTE) transceiver as well as a WLAN transceiver, which may be connected to the eNB and AP at the same time. Because the same multi-radio device is linked to both the eNB and AP, the eNB and AP may act in concert to schedule communications with the multi-radio device to limit interference in situations where both the WWAN and WLAN link are active at substantially the same time.

Figure 1A:
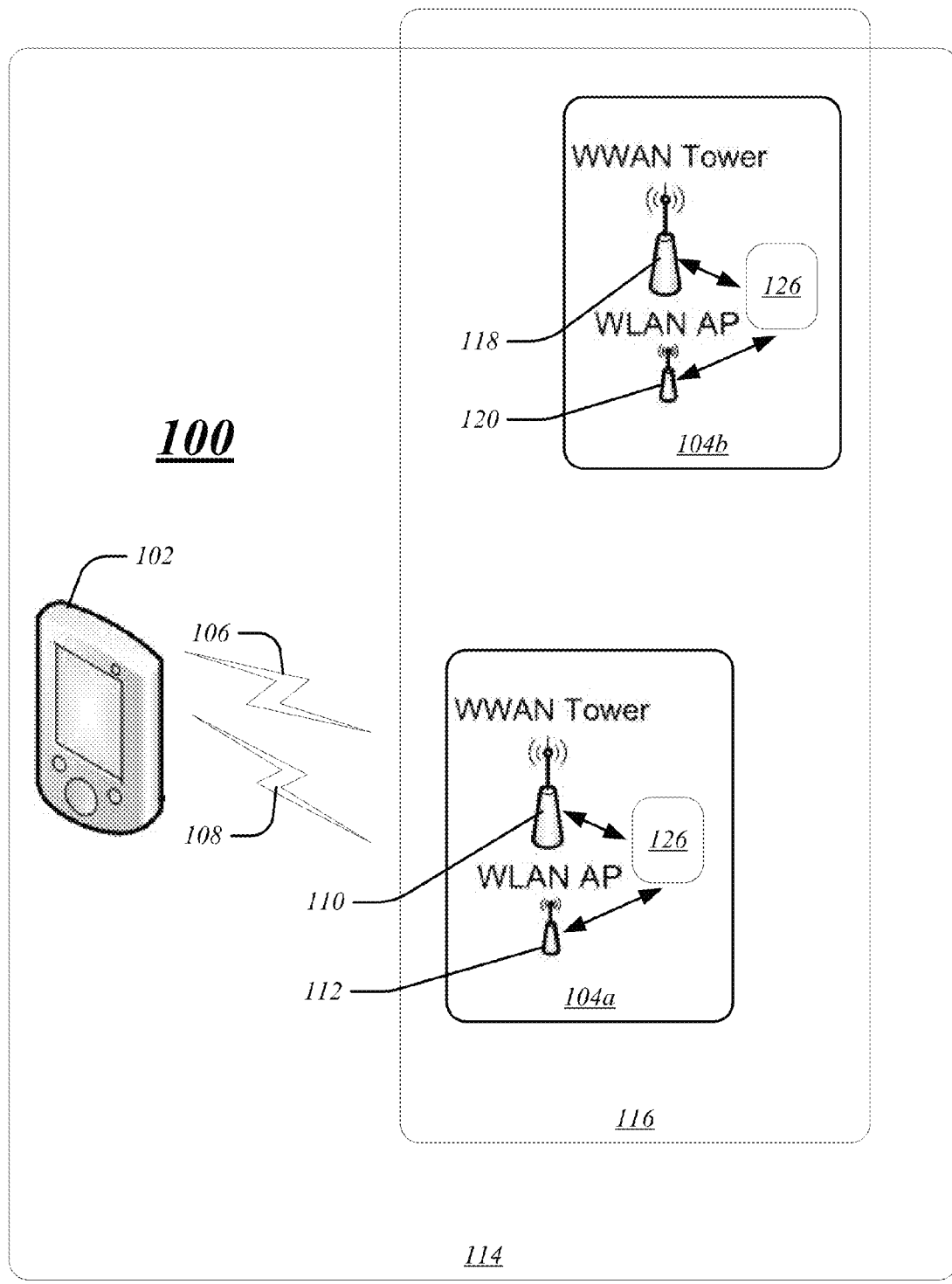
FIG. 1a depicts a system consistent with the present embodiments.

FIG. 1a depicts a system 100 consistent with the present embodiments. As illustrated in FIG. 1a, a wireless device, or multi-radio terminal 102, may interact with various communication nodes in the system 100. The communication nodes may be deployed in multiple different networks whose geographical coverage areas may overlap. In various embodiments, the communication nodes of the system 100 may be implemented using a wireless local area network (WLAN)-based technology including an Institute of Electrical and Electronics Engineers (IEEE) 802.11 (WiFi) transceiver, Bluetooth transceiver, and other known technologies. Some embodiments may be implemented using a radio technology such as global system for mobile communication (GSM), IEEE 802.16 (WiMAX), IEEE 802-20, evolved UTRA (E-UTRA), 3GPP LTE, LTE-A, etc. IEEE 802.16m is an evolution of IEEE 802.16e, and provides backward compatibility with an IEEE 802.16-based system. The UTRA is a component of universal mobile telecommunication system (UMTS), which is a successor technology to GSM. 3rd generation partnership project (3GPP) long term evolution (LTE) is a part of an evolved UMTS (E-UMTS) using the E-UTRA. LTE-advance (LTE-A) is an evolution of the 3GPP LTE.

As illustrated in FIG. 1a, the system 100 may include one or more communications installations, which are shown for clarity as two communications installation 104a, 104b in FIG. 1a. In the scenario depicted in FIG. 1, the multi-radio terminal 102 may initiate communications with one or more resources in communications installation 104a. For example, a user of multi-radio terminal 102 may desire to place a telephone call that may be handled by a network 114 operating the WWAN tower 110 located in the communications installation 104a. After establishing a telephone call, via a radio link 106 to WWAN tower 110, the user may desire to access internet-based services, which may be provided via a radio link 108 to a local network 116 that includes the WLAN AP 112, which is co-located within communications installation 104a. Because the WLAN AP 112 is co-located with the WWAN tower 110, when the multi-radio terminal 102 attempts to access the network 116, communications may be established with WLAN AP 112, which may be the closest access point of network 116 to multi-radio terminal 102, just as WWAN tower 110 may be the closest base station to multi-radio terminal 102 for the network 114.

Figure 1B:
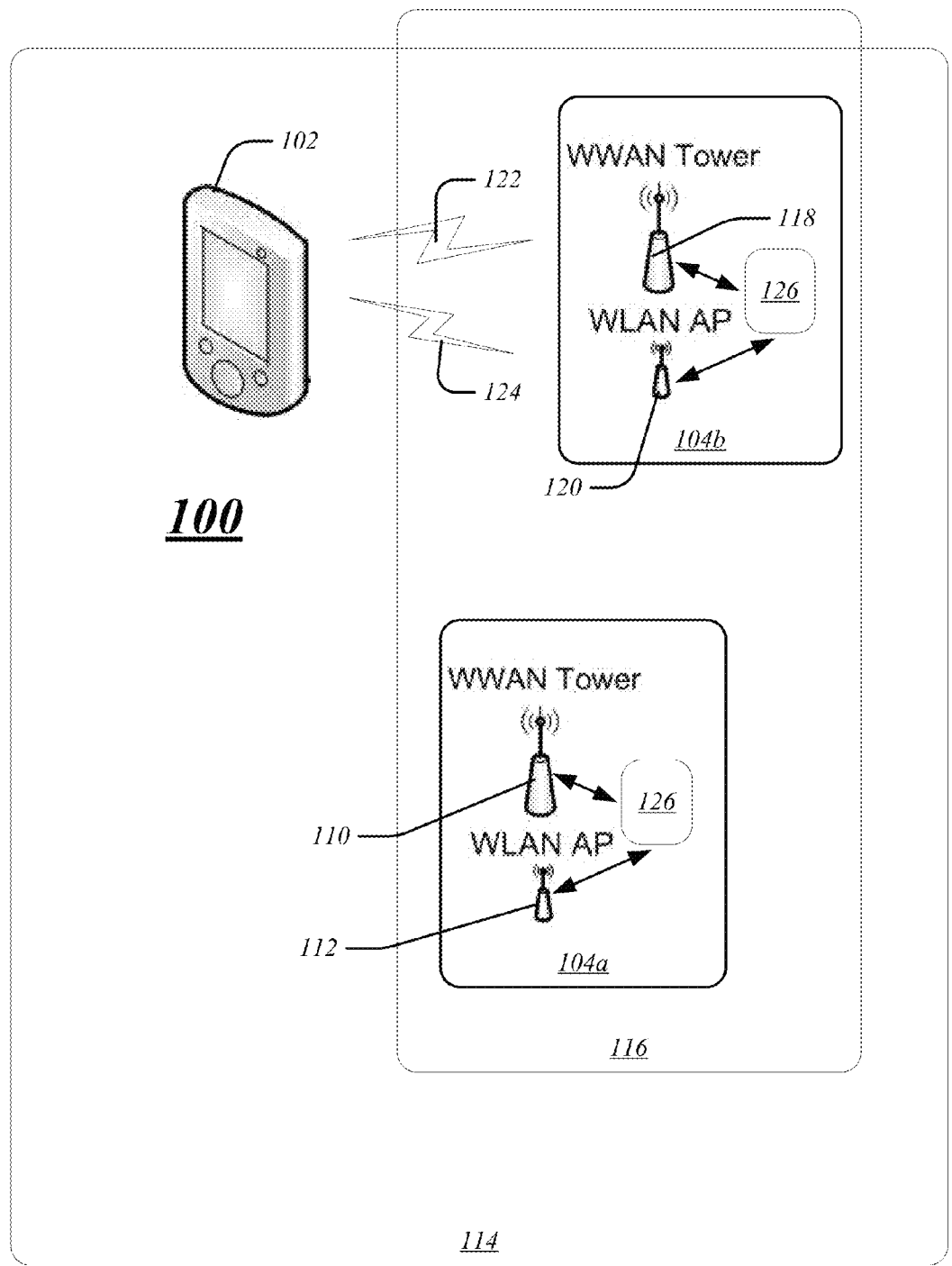
FIG. 1b depicts a scenario consistent with further embodiments.

As the multi-radio terminal 102 moves between different locations, the multi-radio terminal 102 may come into closer proximity to a communications installation 104b. FIG. 1b depicts a scenario in which the multi-radio terminal 102 has moved to a location that places it closer to the communications installation 104b than to communications installation 104a. Because communications installation 104b includes a WWAN tower 118 and WLAN AP 120, an active telephone call formerly handled over radio link 106 may be handed off to be handled by radio link 122. The radio link 108 may be similarly handed off to radio link 124 to handle the internet session. As is evident from the scenario of FIGS. 1a and 1b, multiple radio links from the same multi-radio terminal 102 may be handled by resources that are located in the same communications installation 104a or 104b. Accordingly, one or more communications installation may simultaneously provide separate wireless services to the same multi-radio terminal.

The present embodiments take advantage of the situation illustrated in FIGS. 1a, 1b by providing novel and inventive management of communications conducted over different radio transceivers of a multi-radio terminal. In particular, a coordinating entity, such as a communications scheduling module 126 (see FIGS. 1a, 1b), may be provided to coordinate operation of the components of a communications installation, such as a WWAN base station and a WLAN AP, in order that interference at the multi-radio terminal be limited.

Figure 2A:
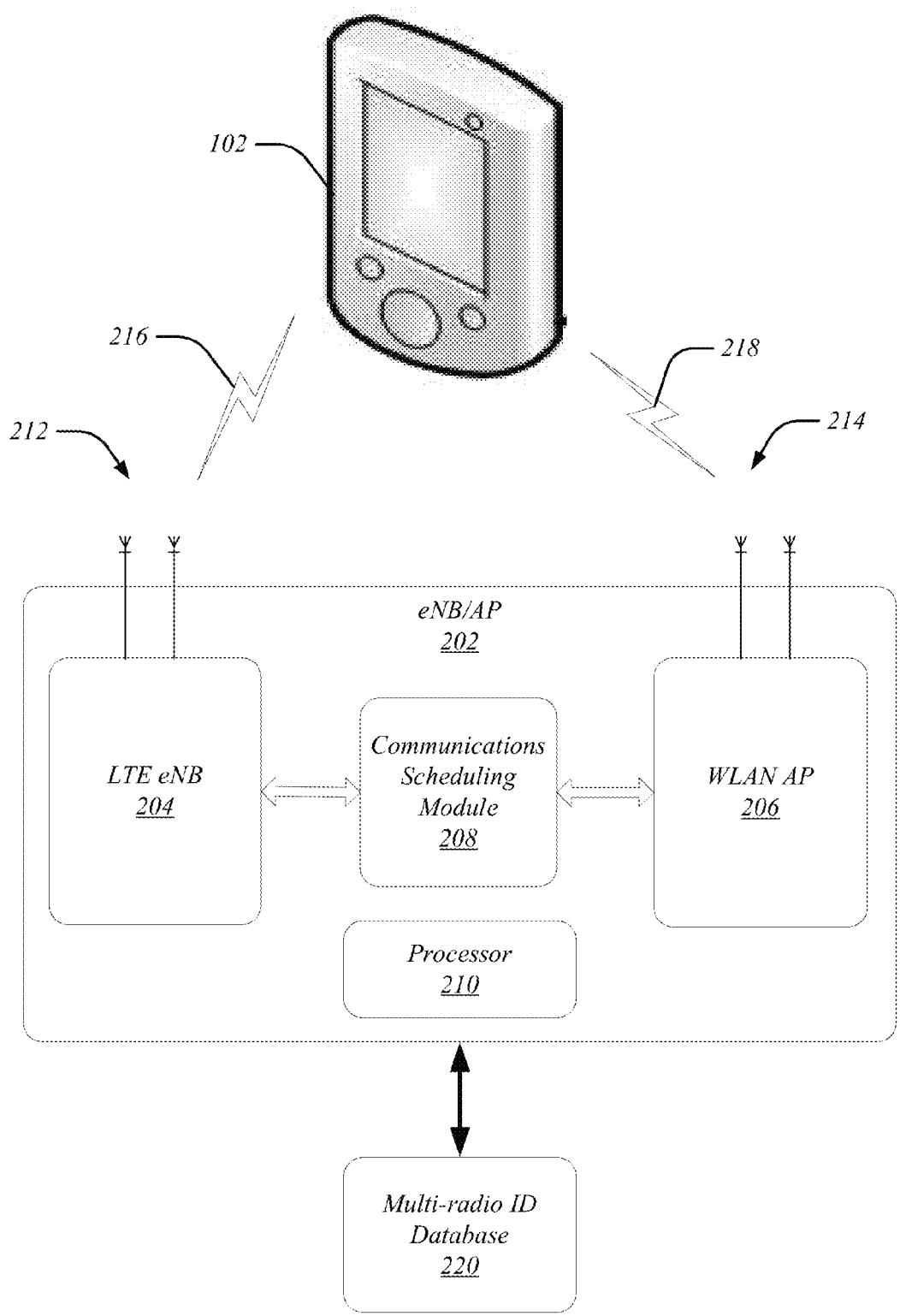
FIG. 2a provides details of a communications installation consistent with various embodiments.

FIG. 2a provides details of a communications installation consistent with various embodiments. In the example specifically depicted in FIG. 2a, the communications installation includes WLAN AP 206 and a 3GPP LTE (or, simply, LTE) eNB 204. The communications installation, termed an eNB/AP 202, may provide radio communications for wireless devices that operate either using 3GPP LTE radio transceivers or WLAN radio transceivers, or both. The eNB/AP may include a communications scheduling module 208, which is communicatively coupled to both the WLAN AP 206 and LTE eNB 204. It is to be noted that although depicted separately, the communications scheduling module 208 may be included as part of the WLAN AP 206 and/or LTE eNB 204 and may be embodied in a combination of software and/or hardware. For example, the communications scheduling module 208 may be operable on a processor 210 to schedule communications between the eNB/AP 202 and various radios coupled to the eNB/AP 202 through the radio links 212 and/or 214.

In various embodiments, the communication scheduling module 208 may be operable to send scheduling messages to LTE eNB 204 to schedule wireless wide area network (WWAN) communications between a transceiver of LTE eNB 204 and an LTE transceiver in multi-radio terminal 102, and to send scheduling messages to an WLAN AP 206 to schedule wireless local area network WLAN communications between a WLAN AP 206 transceiver and a WLAN transceiver in multi-radio terminal 102.

In various embodiments, when a wireless device, such as multi-radio terminal 102, camps onto a network (not shown) via the eNB/AP 202, the communications scheduling module 208 may receive terminal information related to multiple terminal transceivers (that is, transceivers located in a wireless terminal) of the multi-radio terminal 102. The communication scheduling module 126 may then compare terminal information received by eNB/AP 202 from multiple terminal transceivers of the multi-radio terminal 102. In some embodiments, the terminal information may include the identity of a multi-radio terminal (also termed herein "UE/STA") as established through an International Mobile Subscriber Identity (IMSI) or Media Access Control (MAC) address, for example. In various other embodiments, the terminal information may include radio frequency signatures associated with respective LTE and WLAN radios of the multi-radio terminal 102, may include angle of arrival information between radio signals transmitted from an LTE and WLAN radio of multi-radio terminal 102, and/or may include other indicators of location of the various terminal transceivers (also referred to simply as radios) colocated within multi-radio terminal 102. Based on the comparison of terminal information from multiple different terminal transceivers, the eNB/AP 202 may determine that two or more terminal transceivers are colocated in a common multi-radio terminal (202), and may coordinate communications in LTE eNB 204 and WLAN AP 206 accordingly.

For example, the IMSI of the multi-radio terminal 102 may be sent to the LTE network as part of control signals sent when registering with an LTE network via radio link 216. In addition, consistent with the present embodiments, the multi-radio terminal 102 may report an MAC address for the WLAN radio component (not shown) of the multi-radio terminal 102. Alternatively, the reporting of the MAC address may be done after registration when the multi-radio terminal 102 detects interference problems between its different radio transceivers during operation.

In another example, when the multi-radio terminal 102 associates with the WLAN AP 206 via radio link 218, the multi-radio terminal 102 may report the IMSI or a C-RNTI to eNB/AP 202.

The eNB/AP 202 may then store together the received MAC address and IMSI of the multi-radio terminal 102, so that the eNB/AP may realize that radios associated with the stored IMSI and MAC address are colocated in a terminal, thereby allowing communications to be better managed between the eNB/AP 202 and multi-radio terminal 102. For example, if both LTE and WLAN radio components of the multi-radio terminal 102 are registered with the eNB/AP 202, when data or control signals are to be transmitted between the LTE eNB 204 and multi-radio terminal 102, the eNB/AP 202 may be aware that a WLAN link with the multi-radio terminal 102 is also active. Armed with this knowledge, the communications scheduling module 208 may take action to prevent interference that may occur when radio transmissions between the multi-radio terminal 102 and eNB/AP take place over radio links 216 and 218 in an uncoordinated fashion.

In some embodiments, multiple radio information associated with a multi-radio terminal may be stored in a database, such as the multi-radio database 220. This database may store identity information related to multiple radios within a given UE/STA, such as the multi-radio terminal 102. This database may be part of the eNB/AP 202 or may be part of a radio network or core network coupled to the eNB/AP 202, such that information from the multi-radio database 220 can be retrieved for use by the eNB/AP station 202. For example, at an appropriate time, the communication scheduling module 208 may query the multi-radio ID database 220 to determine whether any WLAN MAC address is known for a given UE connected to the LTE eNB 204. If the UE/STA is a multi-radio device that includes a WLAN transceiver, any such WLAN information retrieved from the multi-radio ID database 220 may be used for eNB 204 to properly schedule communications with the connected UE/STA so as to limit interference with a WLAN transceiver that may be active in the same LTE UE. Similarly, at an appropriate time, the communication scheduling module 208 may query the multi-radio ID database 220 to determine whether any LTE IMSI is known for a given WLAN station connected to the WLAN AP 206. If the UE/STA is a multi-radio terminal that includes an LTE transceiver, any such LTE information retrieved from the multi-radio identifier (ID) database 220 may likewise be used for WLAN AP 206 to properly schedule communications with the connected station so as to limit interference with an LTE transceiver that may be active in the same WLAN station.

Figure 2B:
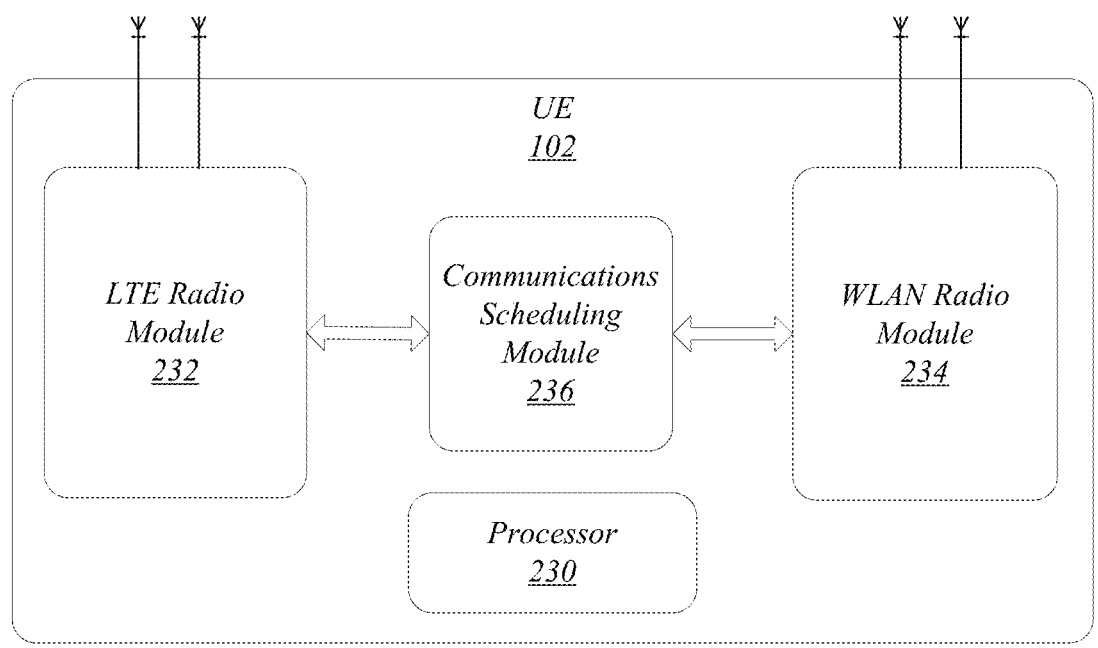
FIG. 2b provides details of a multi-radio terminal consistent with various embodiments.

FIG. 2b depicts a multi-radio terminal consistent with the present embodiments. In the example illustrated, the multi-radio terminal 102 includes a processor 230, an LTE radio module 232, a WLAN radio module 234, and a communications scheduling module 236. The communications scheduling module 236 may perform various functions. In one example, the communications scheduling module 236 may schedule reporting of various information from the LTE radio module 232 and WLAN radio module 234. The information may in some cases be sent based upon a triggering condition or event. Such information may include identification messages that provide the identity of the LTE radio module 232 and/or WLAN radio module 234 identity. In particular, the information in the identification message(s) scheduled by the collocation module 236 may provide an indication that the LTE radio module 232 and WLAN radio module 234 are collocated. For example, the communications scheduling module 236 may schedule the LTE radio module to report the MAC address of the WLAN radio module 234 when the communications scheduling ascertains that there is a coexistence problem between the LTE radio module 232 and WLAN radio module 234. The communications scheduling module 236 may likewise schedule the WLAN radio module 234 to report the LTE IMSI LTE radio module 232 when the communications scheduling ascertains that there is a coexistence problem between the LTE radio module 232 and WLAN radio module 234. The coexistence problem may be excessive interference between a simultaneously receiving radio and a transmitting radio, for example.

The communications scheduling module 236 may thus schedule multiple messages to be sent to an eNB/AP, such as a first message reporting a first radio ID of a first radio module of the multi-radio terminal 102, and a second message reporting a first radio ID of a first radio module of the multi-radio terminal 102. Such information may assist the eNB/AP in managing scheduling of communications between the multi-radio terminal 102 and eNB/AP as described further below.

Figure 3:
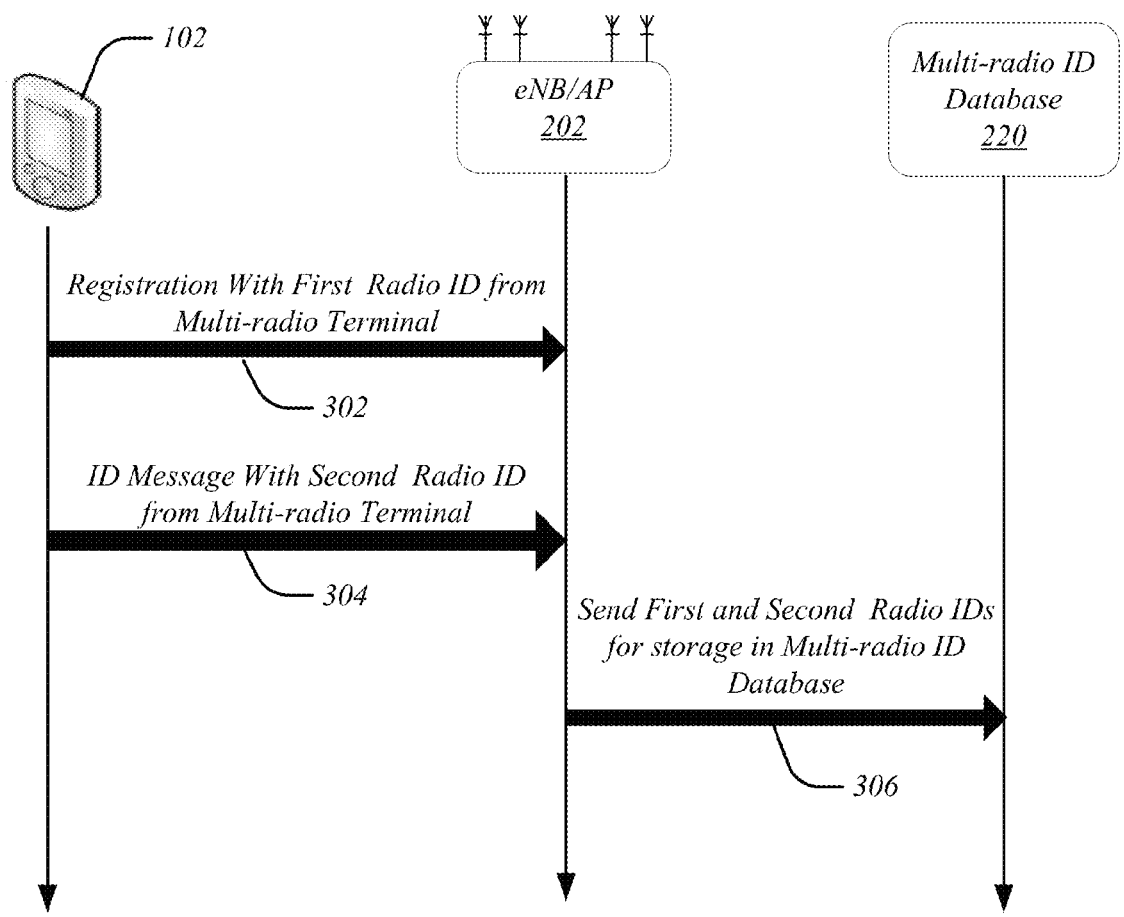
FIG. 3 depicts an example of signaling between a multi-radio terminal and eNB/AP station consistent with various embodiments.

FIG. 3 depicts an example of signaling between a multi-radio terminal 102 and eNB/AP 202 consistent with various embodiments. In the example illustrated, the multi-radio terminal 102 may send a registration message 302 to the eNB/AP 202. In some embodiments, the registration message may be an RRCConnectionRequest message as defined in the 3GPP TS 36.331 (Technical Specification 36.331 V10.3.0, §6.2.2; 3rd Generation Partnership Project; Technical Specification Group Radio Access Network; Evolved Universal Terrestrial Radio Access (E-UTRA); Radio Resource Control (RRC); Protocol specification; Release 10; (2011-09).

This message may be sent in order to acquire or associate with the network that manages one of the components eNB 204 or WLAN AP 206 of the eNB/AP 202. This process of acquiring a network may involve downlink synchronization and ranging between the eNB 204 and multi-radio terminal 102, for example.

Subsequently, an identification message 304 containing a second wireless radio ID of the multi-radio terminal 102 may be sent to the eNB/AP 202. As noted, this may take place in conjunction with a registration process of the multi-radio terminal, or may take during operation of the multi-radio terminal, for example, when interference occurs between the first and second wireless radios of the multi-radio terminal 102.

Once the multi-radio terminal 102 is registered with the eNB/AP 202, the ID associated with the radio transceiver of the multi-radio terminal 102 that is used to register the multi-radio terminal 102 may be known to the eNB/AP 202 due to the nature of required control signaling during the registration process. In addition, after message 304 is received, the ID associated with a second radio transceiver of the multi-radio terminal 102 is also known to the eNB/AP 202. Subsequently, the eNB/AP 202 may send a message 306 to store the first and second radio transceiver IDs together in a record of the multi-radio ID database 220.

Figure 4:
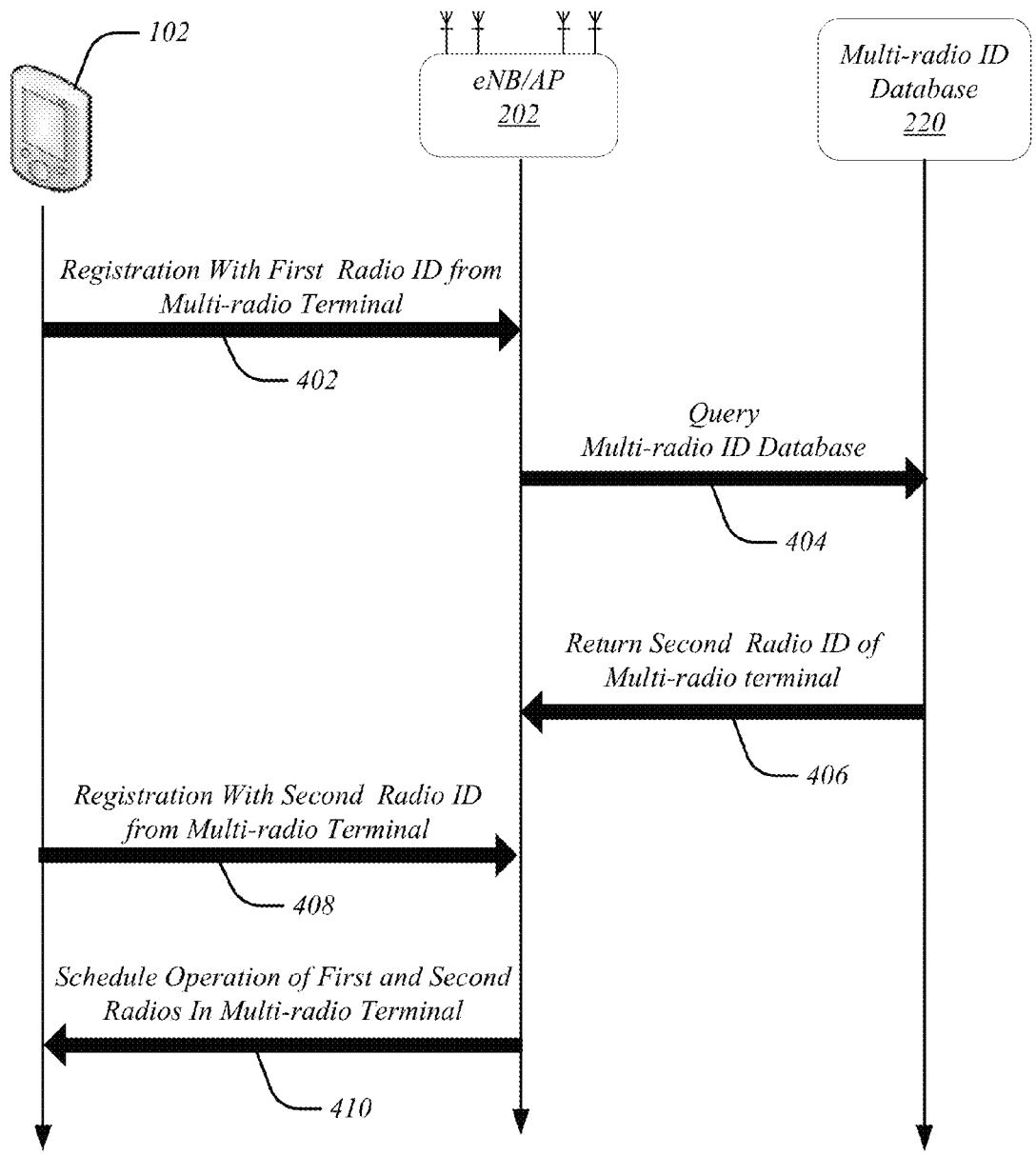
FIG. 4 depicts further example of signaling between a multi-radio terminal and eNB/AP consistent with various embodiments.

FIG. 4 depicts further example of signaling between the multi-radio terminal 102 and eNB/AP 202 consistent with various embodiments. The signaling depicted in FIG. 4 may represent signaling that takes place subsequently to that depicted in FIG. 3. The message 402 represents another instance in which the multi-radio terminal 102 registers via a first radio ID with the eNB/AP 202. After registration, the eNB/AP 202 may send a query message 404 to the multi-radio ID database 220 to check a record associated with the radio ID received in message 402. For example, if the message 402 registers an LTE wireless terminal, the multi-radio ID database 220 may be queried by supplying the ID (IMSI, for example) associated with that LTE wireless terminal, which happens to be the multi-radio terminal 102. Subsequently, a message 406 may be returned from the multi-radio ID database 220, which includes a second radio ID that is associated with the multi-radio terminal 102. For example, the second radio ID may comprise a MAC address associated with a WLAN transceiver listed in multi-radio database 220 together with the LTE IMSI received in message 402.

Figure 5:
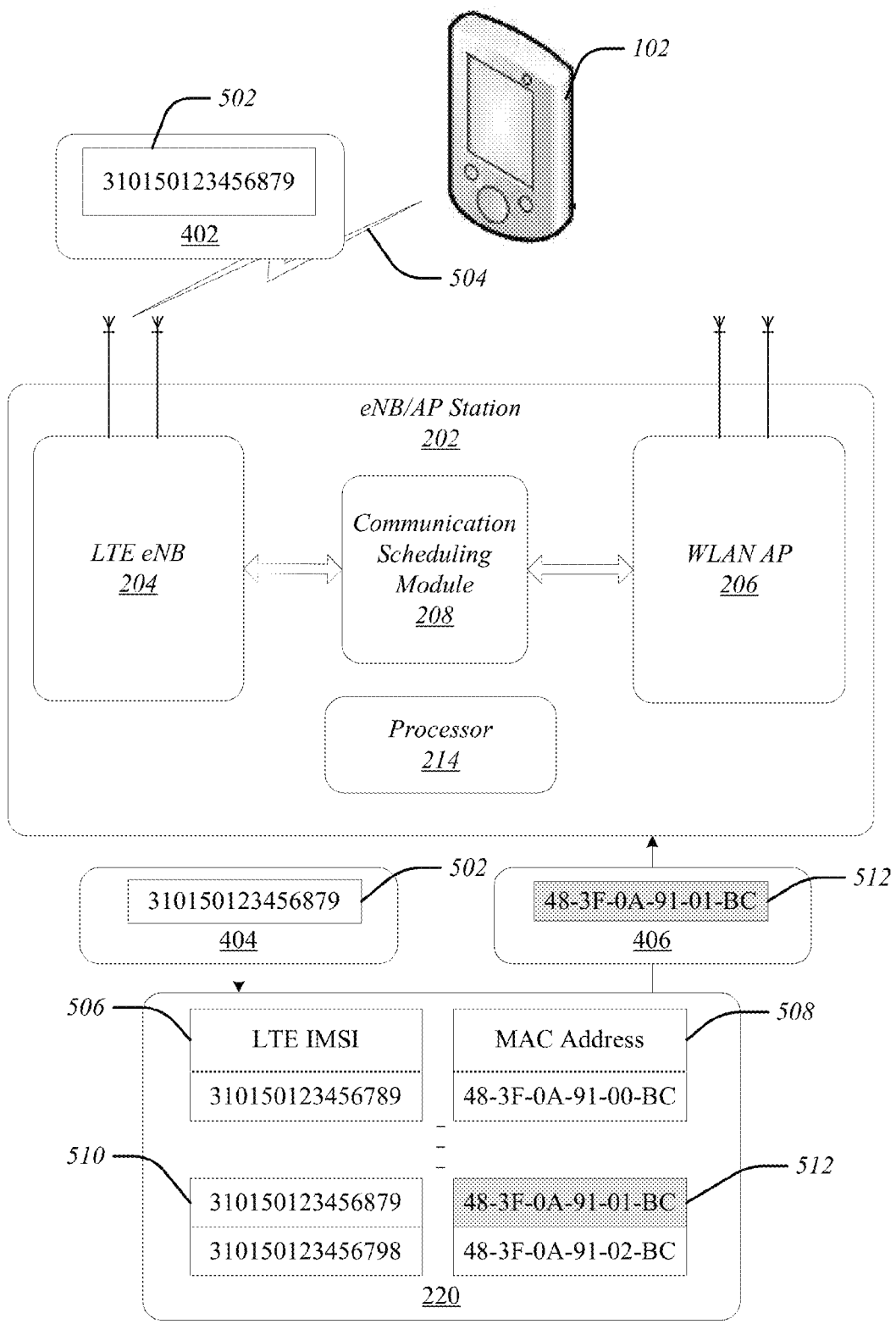
FIG. 5 shows details of implementation of signaling depicted in FIG. 4 according to one embodiment.

FIG. 5 shows architectural details of implementation of the messages 402, 404, and 406 according to one embodiment. As illustrated, the message 402 represents a registration message for an LTE radio that includes an IMSI 502. The message 402 is sent over a radio uplink 504, which is received by the LTE eNB 204. The eNB/AP may process the received message by forwarding the IMSI 502 in the message 404 to the multi-radio database 220 in order to query a record containing the IMSI 502. In the example of multi-radio ID database 220 shown in FIG. 5, each of multiple entries of an LTE IMSI group 506 is paired with a corresponding entry in a MAC address group 508. Thus, the received IMSI 502 in message 404 may be matched to IMSI record 510. In turn, the IMSI record 510 may be mapped to its paired MAC address 512, which represents the MAC address of a WLAN radio of multi-radio terminal 102. The retrieved MAC address 512 may then be sent in a message 406 to the eNB/AP.

Returning now to FIG. 4, a further registration message 408 may be received in which the multi-radio terminal 102 registers (or associates) via the second radio ID with the eNB/AP 202. This may take place while the first radio of the multi-radio terminal 102 is connected to the eNB/AP 202. When the registration message 408 is received, since the eNB/AP is aware from message 406 that the first and second radio IDs are associated with the same terminal, the eNB/AP 202 may then determine that two radio devices located in the same multi-radio terminal are currently connected to the eNB/AP 202. For example, information indicating that an LTE radio in multi-radio terminal 102 is connected to eNB 204 and a WLAN radio in the same multi-radio terminal 102 is connected to WLAN AP 206 may be collected in the communications scheduling module 208, and may be shared with both the eNB 204 WLAN AP 206. Subsequently, the eNB/AP 202 may forward message(s) 410 to the multi-radio terminal 102 to schedule operation of the first and second radios. These messages 410 may be transmitted from either eNB 204 and/or WLAN AP 206 to respective radios of multi-radio terminal 102 to which the eNB 204 and WLAN AP are connected. Because of knowledge that the first and second radios are colocated in the multi-radio terminal 102, messages 410 sent from the eNB/AP 202 may provide signaling to control when and how communications are to be transmitted between the eNB/AP 202 and various radios of the multi-radio terminal 102. Thus, for example, communications over an LTE radio link may be arranged so as not to coincide with those that take place over a WLAN link.

Figure 6:
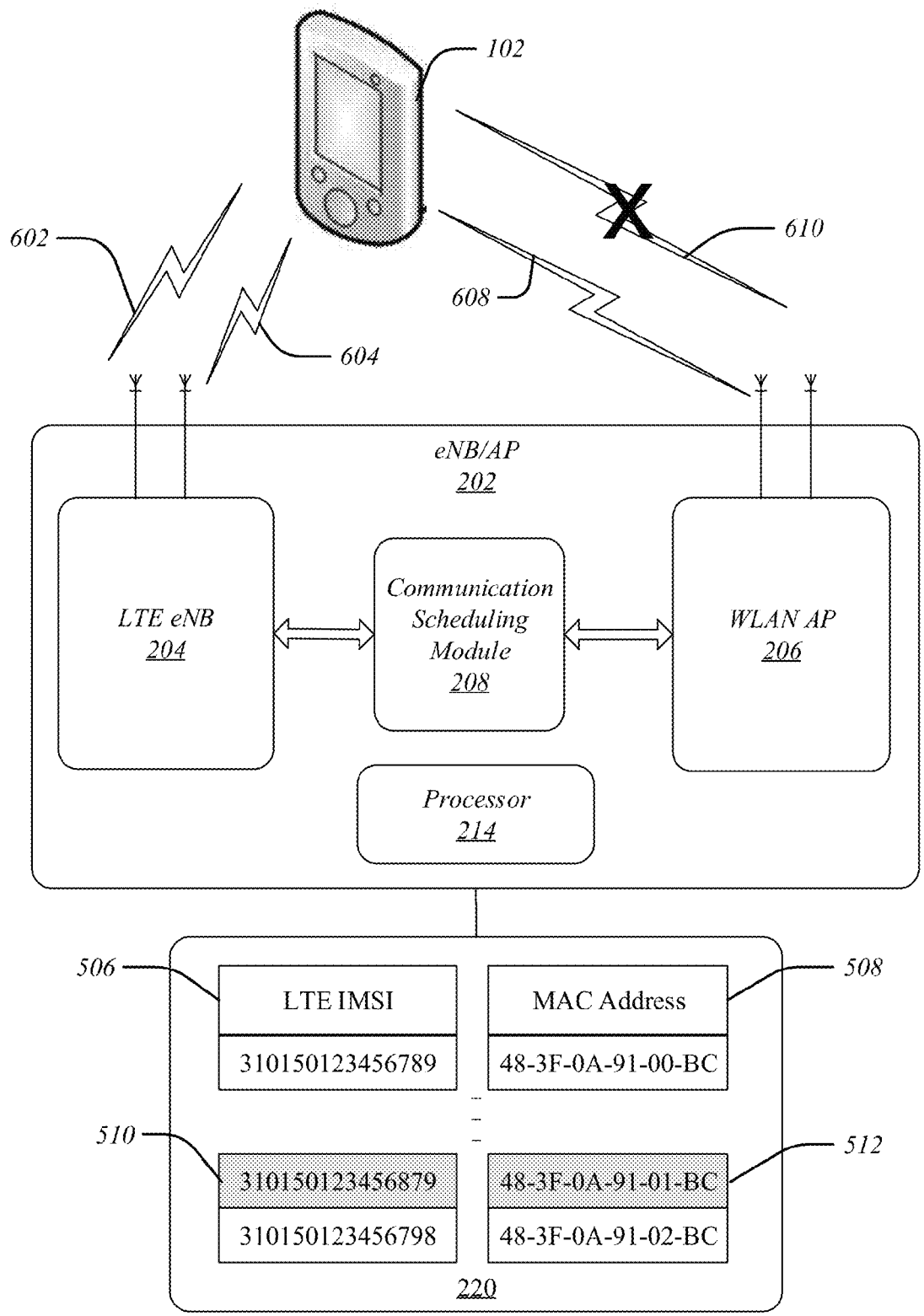
FIG. 6 shows details of implementation of the signaling depicted in FIG. 4 according to one embodiment.

FIG. 6 shows details of implementation of the messages 410 according to one embodiment. As illustrated, when both an LTE radio and WLAN radio of multi-radio terminal 102 are connected to the eNB/AP 202, the LTE eNB 204 may communicate with the multi-radio terminal 102 over uplink 602 and downlink 604. In addition, the WLAN AP 206 may communicate with the multi-radio terminal 102 over the uplink 608. However, when the LTE eNB 204 is scheduling uplink transmissions over uplink 602, the communication scheduling module 208 may be aware of the fact that the WLAN AP 206 is connected to a WLAN radio in the multi-radio terminal 102. Because of this, the communication scheduling module 208 may determine that communications between the multi-radio terminal 102 and WLAN AP 206 are to be coordinated with communications between multi-radio terminal 102 and LTE eNB 204, so as to limit potential interference that may occur when a first radio in multi-radio terminal 102 is receiving communications while a second radio in the multi-radio terminal 102 is transmitting communications.

Consistent with various embodiments, the communications scheduling module 208 may perform one or more actions to limit the potential interference. In some embodiments, the communications scheduling module 208 may coordinate with the WLAN AP 206 and LTE eNB 204 so that time division multiplexing is performed between the WLAN AP 206 and LTE eNB 204. In one example, interference between the communications between LTE eNB 204 and multi-radio terminal 102 on the one hand, and communications between WLAN AP 206 and the multi-radio terminal on the other hand, may be limited to particular uplink-downlink combination(s). For instance, for LTE communications over a band 7 frequency, interference may be limited to when traffic is presently simultaneously between the uplink 602 to the LTE eNB 204 and downlink 610 from the WLAN AP 206.

Accordingly, the communication scheduling module 208 may determine that time division multiplexing need only be applied in the case of a scheduled uplink transmission from the LTE radio of the multi-radio terminal 102 and a scheduled downlink transmission from the WLAN AP 206 to the multi-radio terminal 102. In order to implement this time division multiplexing, every time an uplink transmission occurs over the uplink 602 to the LTE eNB 204, downlink transmissions over downlink 610 from the WLAN AP may be prevented from taking place, as illustrated in FIG. 6. At other times, for example, when an uplink transmission from the multi-radio terminal 102 is to take place over the uplink 608 to WLAN AP 206, communications over the downlink 604 from LTE eNB 204 to the multi-radio device 102 may be permitted, since the frequency range of communication over the downlink 604 may not overlap with the frequency range of communications over the uplink 608. In this manner, potential interference between radios in the multi-radio terminal 102 may be limited, while communications between multi-radio device 102 and eNB/AP 202 are not unnecessarily restricted by imposing time division duplexing between LTE eNB 204 and WLAN AP 206 when it is not required.

In another example of time division multiplexing, if downlink transmissions over downlink 610 from the WLAN AP 206 are taking place, the communications scheduling module 208 may prevent uplink transmission from taking place over the uplink 602 to the LTE eNB 204.

In additional embodiments, a communications scheduling module 208 may take further actions to limit interference in a multi-radio terminal 102 that has multiple radios connected at the same time to the eNB/AP 202. In one embodiment, once it is determined that an LTE radio and WLAN radio are both connected to eNB/AP 202, the communications scheduling module 208 may send signals to the LTE eNB 204 to transmit a message over link 216 to the multi-radio terminal 102 to enter a discontinuous reception (DRX) mode. In the DRX mode, as specified in 3GPP LTE, the duty cycle in which a transceiver is "on" is reduced while in active operation. Thus, during "off" periods of a DRX mode, a radio transceiver in a multi-radio terminal may receive no traffic. Accordingly, a colocated WLAN transceiver transmitting uplink transmissions over a WLAN link may encounter no interference from the colocated LTE transceiver during DRX mode "off" periods. While this may not completely eliminate interference between an LTE transceiver and WLAN transceiver colocated in the same UE, the extent of interference may be reduced to a level within a tolerable range.

In other embodiments, instead of or in addition to configuring the LTE transceiver to a DRX mode, the communications scheduling module 208 may send signals to the WLAN/AP 206 to transmit a message over link 216 to the multi-radio terminal 102 to configure a WLAN transceiver of the multi-radio terminal 102 to enter an unscheduled automatic power save delivery (U-APSD) mode. U-APSD is a power save scheme that can be effective for real-time applications transferring full-duplex data over WLAN (such as VoIP). In the U-APSD mode, communications received at a WLAN transceiver in the multi-radio terminal over a WLAN downlink may cause less interference with an LTE uplink of a collocated LTE transceiver even if the downlink and uplink overlap in frequency.

In other embodiments, the communication scheduling module 208 may determine that multiple radios are colocated in a single terminal by comparing radio frequency (RF) fingerprints received from multiple transceivers, which RF fingerprints may be prestored in a database that stores together different RF fingerprints associated with different transceivers located within a common terminal. Alternatively, the communication scheduling module 208 may determine colocation for two different radios of a common multi-radio terminal based upon the magnitude of the angle of arrival between signals from the two radios detected at the eNB/.AP 202.

One advantage afforded by the present embodiments is that communications over a first radio link between a first radio of a multi-radio device and network, can be rapidly adapted based upon changes in a second radio link between a second radio of the multi-radio device and network. For example, when an LTE radio transmitting over the second link becomes disconnected from an eNB/AP, this may be detected by a communications scheduling module that coordinates communications over the first and second links. The communications scheduling module may rapidly apprise a WLAN AP that the LTE connection has dropped, allowing the WLAN AP to schedule exit of the WLAN radio transmitting over the first link from a U-APSD mode.

Included herein is a set of flow charts representative of exemplary methodologies for performing novel aspects of the disclosed system and architecture. While, for purposes of simplicity of explanation, the one or more methodologies shown herein, for example, in the form of a flow chart or flow diagram, are shown and described as a series of acts, it is to be understood and appreciated that the methodologies are not limited by The order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
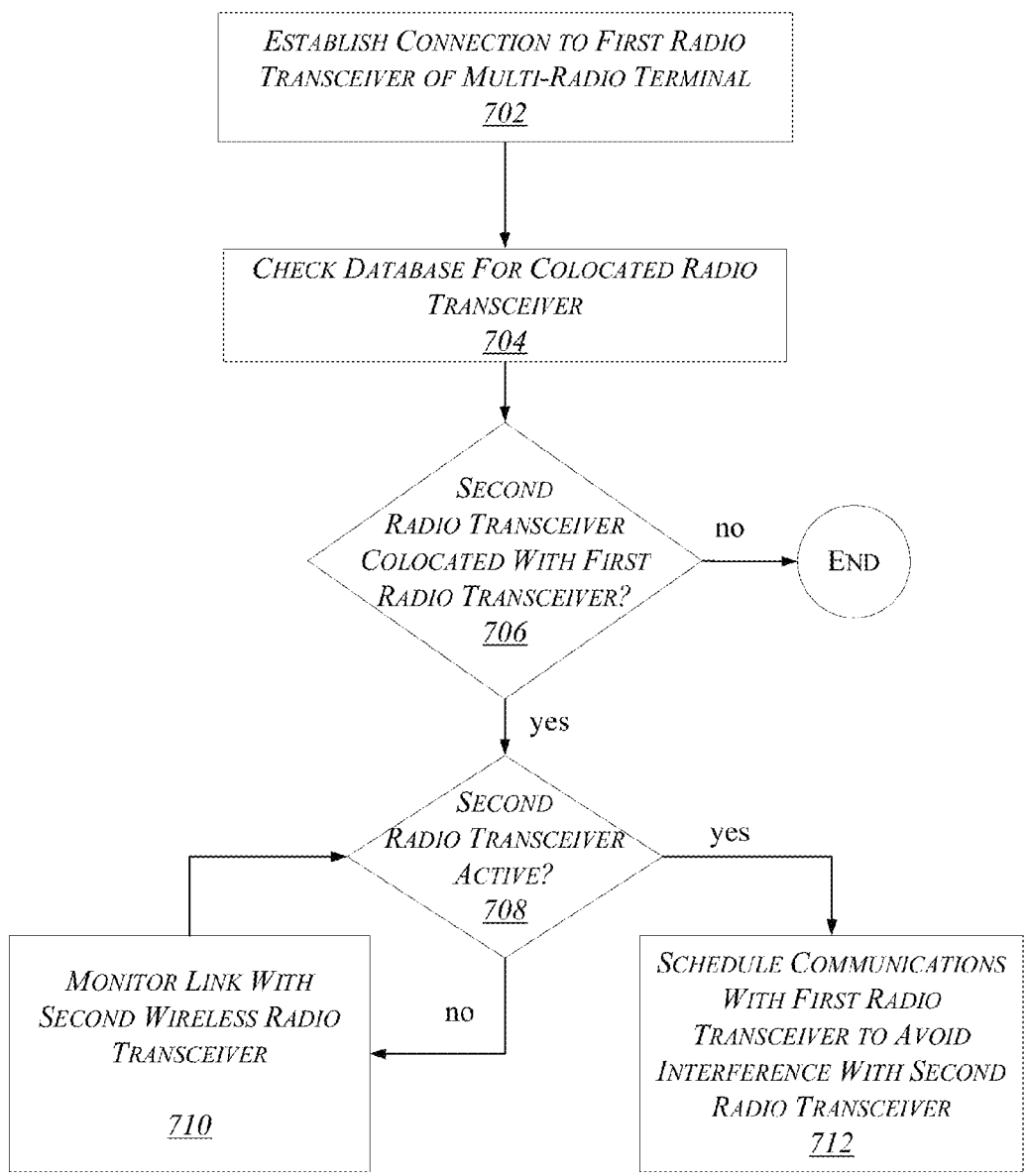
FIG. 7 depicts one exemplary logic flow.

FIG. 7 depicts one exemplary logic flow 700. At block 702, a connection is established with a first radio transceiver of a multi-radio terminal.

At block 704, a database is checked to determine if one or more other radio transceivers are listed that are colocated in the same multi-radio terminal as the first radio transceiver. For example, the database may include a set of records for multi-radio devices in which each record contains an ID corresponding to a first type of radio transceiver, such as an LTE IMSI, and an ID corresponding to a second type of radio transceiver, such as a WLAN MAC address.

At block 706, a determination is made as to whether a second radio transceiver is colocated with the first radio transceiver in a single multi-radio device. The determination may be based upon whether an entry for a second radio transceiver ID is found in a record containing the first radio transceiver ID. Thus, if a MAC address entry is found in a record listing an LTE IMSI for the first radio transceiver, it is deemed that a second radio transceiver corresponding to the MAC address listed is colocated in a multi-radio terminal with the first radio transceiver.

If no colocated second radio transceiver is found at block 706, the flow ends. If an ID corresponding to a second radio transceiver colocated with the first radio transceiver is found at block 706, the flow proceeds to block 708.

At block 708, a determination is made as to whether the second radio transceiver is active, that is, whether the second radio transceiver is in a connected mode over a link with an LTE eNB, WLAN AP, or other communication node.

If at block 708, the second radio transceiver is deemed to not be active, the flow proceeds to block 710. At block 710, the link with the second radio transceiver is monitored, after which the flow returns to block 708.

If, at block 708, the second radio transceiver is deemed to be active, the flow proceeds to block 712. At block 712, communications with the first radio transceiver are scheduled to limit interference with the second radio transceiver.

Figure 8:
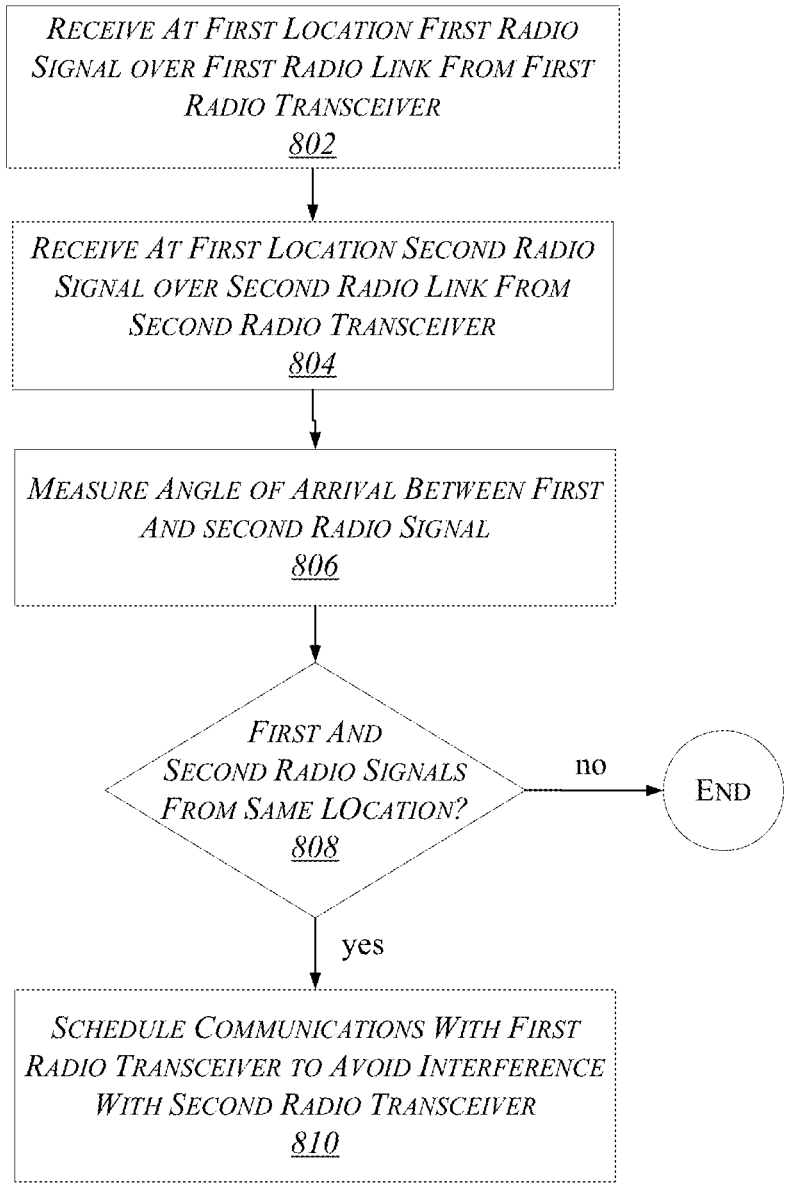
FIG. 8 depicts another exemplary logic flow.

FIG. 8 depicts another exemplary logic flow 800. At block 802, a first radio signal is received at a first location over a first radio link from a first radio transceiver. The first radio signal may be received when the first radio transceiver is operating in a connected mode.

At block 804, a second radio signal is received at the first location over a second radio link from a second radio transceiver. The second radio signal may be received when the second radio transceiver is operating in a connected mode.

At block 806, an angle of arrival is measured between the first and the second radio signals.

At block 808, a determination is made as to whether the first and second radio signals are from the same location, that is, whether the transceivers sending the first and second radio signals are colocated in a single multi-radio terminal. This determination may be based upon the magnitude of the measured angle of arrival. If the first and second radio signals are deemed not to arise from the same location, the flow moves to end.

If the first and second radio signals are deemed to arise from the same location, the flow proceeds to block 810. At block 810, communications are scheduled with the first radio transceiver to avoid interference with the second radio transceiver.

Figure 9:
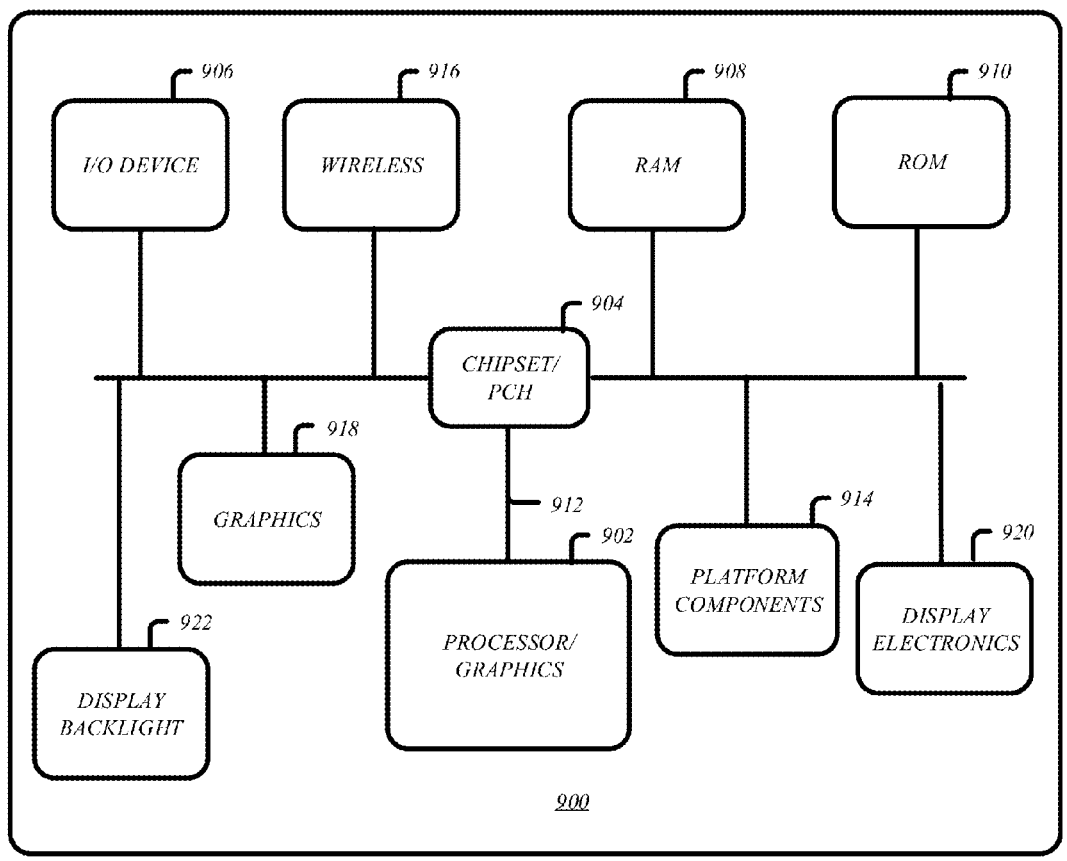
FIG. 9 depicts an embodiment of a computing system.

FIG. 9 is a diagram of an exemplary system embodiment and in particular, FIG. 9 is a diagram showing a platform 900, which may include various elements. For instance, FIG. 9 shows that platform (system) 900 may include a processor/graphics core 902, a chipset/platform control hub (PCH) 904, an input/output (I/O) device 906, a random access memory (RAM) (such as dynamic RAM (DRAM)) 908, and a read only memory (ROM) 910, display electronics 920, display backlight 922, and various other platform components 914 (e.g., a fan, a crossflow blower, a heat sink, DTM system, cooling system, housing, vents, and so forth). System 900 may also include wireless communications chip 916 and graphics device 918. The embodiments, however, are not limited to these elements.

As shown in FIG. 9, I/O device 906, RAM 908, and ROM 910 are coupled to processor 902 by way of chipset 904. Chipset 904 may be coupled to processor 902 by a bus 912. Accordingly, bus 912 may include multiple lines.

Processor 902 may be a central processing unit comprising one or more processor cores and may include any number of processors having any number of processor cores. The processor 902 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 902 may be multiple separate processors located on separate integrated circuit chips. In some embodiments processor 902 may be a processor having integrated graphics, while in other embodiments processor 902 may be a graphics core or cores.

Figure 10:
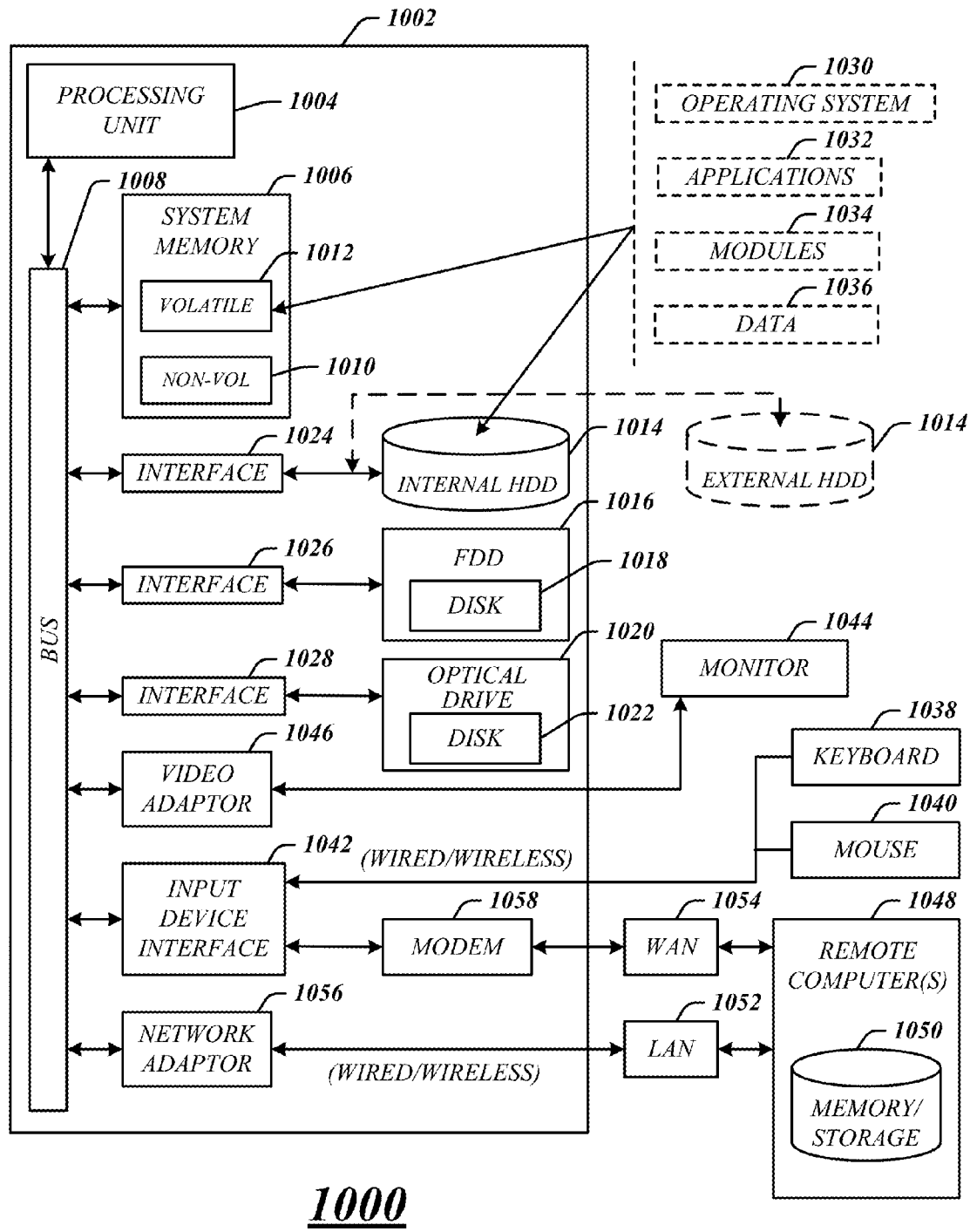
FIG. 10 illustrates one embodiment of a computing architecture.

FIG. 10 illustrates an embodiment of an exemplary computing system (architecture) 1000 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1000 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1000 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors. Dual microprocessors and other multi processor architectures may also be employed as the processing unit 1004. The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures.

The computing architecture 1000 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1094 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036.

A user can enter commands and information into the computer 1002 through one or more wire/wireless input devices, for example, a keyboard 1038 and a pointing device, such as a mouse 1040. Other input devices may include a microphone, an infra-red (IR) remote control, a joystick, a game pad, a stylus pen, touch screen, or the like. These and other input devices are often connected to the processing unit 1004 through an input device interface 1042 that is coupled to the system bus 1008, but can be connected by other interfaces such as a parallel port, IEEE 1294 serial port, a game port, a USB port, an IR interface, and so forth.

A monitor 1044 or other type of display device is also connected to the system bus 1008 via an interface, such as a video adaptor 1046. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a processor circuit; and
a communication scheduling module operable on the processor circuit to:
   read a first identity (ID) associated with one of a first terminal transceiver and a second terminal transceiver and sent during a registration message from a radio terminal;
   flag a second identity (ID) in the registration message corresponding to the other of the first and second terminal transceivers;
   store the first and second IDs in a common record;
   receive a first set of terminal information of the first terminal transceiver, and a second set of terminal information of the second terminal transceiver;
   determine whether the first and second terminal transceivers are co-located in the radio terminal based on the first and second sets of terminal information; and
   in response to a determination that the first and second terminal transceivers are co-located:
     schedule first and second radio-frequency (RF) communications with the first and second terminal transceivers, respectively, of the radio terminal to reduce interference between the first and second communications;
     send scheduling messages to an evolved node B (eNB) operable to schedule wireless wide area network (WWAN) communications between a first wireless transceiver and the first terminal transceiver; and
     send scheduling messages to an access point (AP) operable to schedule wireless local area network (WLAN) communications between a second wireless transceiver and the second terminal transceiver, the eNB and the AP co-located within a same communications installation.

2. The apparatus of claim 1, the communication scheduling module operable on the processor circuit to provide a message to switch operation of the second terminal transceiver to unscheduled automatic power save delivery (U-APSD), in response to the determination that the first and second terminal transceivers are co-located within the radio terminal.

3. The apparatus of claim 1, the communication scheduling module operable on the processor circuit to switch operation of the first terminal transceiver to discontinuous reception (DRX), in response to the determination that the first and second terminal transceivers are co-located within the radio terminal.

4. The apparatus of claim 1, the first set of terminal information comprising a media access control (MAC) address of the second terminal transceiver.

5. The apparatus of claim 1, the second set of terminal information comprising an international mobile subscriber identity (IMSI) or a cell radio network temporary identifier (C-RNTI).

6. The apparatus of claim 1, the communication scheduling module operable on the processor circuit to perform one or more of:
read an RF fingerprint of output from the first and second terminal transceivers;
check location information associated with the first and second transceivers; and
determine an angle of arrival between first and second radio signals transmitted by the respective first and second terminal transceivers.

7. The apparatus of claim 1, comprising a magnetic storage device to store identity information of radio terminals registered with the apparatus.

8. A method, comprising:
reading a first identity (ID) associated with one of a first terminal transceiver and a second terminal transceiver and sent during a registration message from a radio terminal;
flagging a second identity (ID) in the registration message corresponding to the other of the first and second terminal transceivers;
storing the first and second IDs in a common record;
receiving a first set of terminal information of the first terminal transceiver and a second set of terminal information of the second terminal transceiver;
determining whether the first and second transceiver are co-located in the radio terminal based on the first and second sets of terminal information; and
in response to a determination that the first and second terminal transceivers are co-located:
scheduling first and second radio frequency (RF) communications with the first and second radio terminal transceivers, respectively, of the radio terminal so as to limit interference between the first and second communications;
sending scheduling messages to an evolved node B (eNB) operable to schedule wireless wide area network (WWAN) communications between a first wireless transceiver and the first terminal transceiver; and
sending scheduling messages to an access point (AP) operable to schedule wireless local area network (WLAN) communications between a second wireless transceiver and the second terminal transceiver, the eNB and the AP co-located within a same communications installation.

9. The method of claim 8, comprising:
in response to the determination that the first and second terminal transceivers are co-located, performing one or more of:
sending a control directive to switch operation of the second terminal transceiver to unscheduled automatic power save delivery (U-APSD); and
sending a control directive to switch operation of the first terminal transceiver to discontinuous reception (DRX).

10. The method of claim 8, comprising performing one or more of:
reading an RF fingerprint of output from the first and second terminal transceivers;
checking location information associated with the first and second transceivers; and
determining an angle of arrival between first and second radio signals transmitted by the respective first and second terminal transceivers.

11. At least one non-transitory computer-readable storage medium comprising a plurality of instructions that, when executed, cause a system to:
read a first identity (ID) associated with one of a first terminal transceiver and a second terminal transceiver and sent during a registration message from a radio terminal;
flag a second identity (ID) in the registration message corresponding to the other of the first and second terminal transceivers;
store the first and second IDs in a common record;
receive a first set of terminal information of the first terminal transceiver, and a second set of terminal information of the second terminal transceiver;
determine whether the first and second terminal transceivers are co-located in the radio terminal based on the first and second sets of terminal information;
in response to a determination that the first and second terminal transceivers are co-located:
schedule first and second radio-frequency (RF) communications with the first and second terminal transceivers, respectively, of the radio terminal to reduce interference between the first and second communications;
send scheduling messages to an evolved node B (eNB) operable to schedule wireless wide area network (WWAN) communications between a first wireless transceiver and the first terminal transceiver; and
send scheduling messages to an access point (AP) operable to schedule wireless local area network (WLAN) communications between a second wireless transceiver and the second terminal transceiver, the eNB and the AP co-located within a same communications installation.

12. The at least one non-transitory computer-readable storage medium of claim 11 comprising instructions that, when executed, cause a system to provide a message to switch operation of the second terminal transceiver to unscheduled automatic power save delivery (U-APSD), in response to the determination that the first and second terminal transceivers are co-located within the radio terminal.

13. The at least one non-transitory computer-readable storage medium of claim 11 comprising instructions that, when executed, cause a system to switch operation of the first terminal transceiver to discontinuous reception (DRX), in response to the determination that the first and second terminal transceivers are co-located within the radio terminal.

14. The at least one non-transitory computer-readable storage medium of claim 11 comprising instructions that, when executed, cause a system to perform one or more of:
read an RF fingerprint of output from the first and second terminal transceivers;
check location information associated with the first and second transceivers; and determine an angle of arrival between first and second radio signals transmitted by the respective first and second terminal transceivers.

\* \* \* \* \*